Feb. 1, 1949. E. P. COOK 2,460,278
ROTARY PUMP FOR THICK FIBROUS SUSPENSIONS
Filed Feb. 4, 1944 10 Sheets-Sheet 1
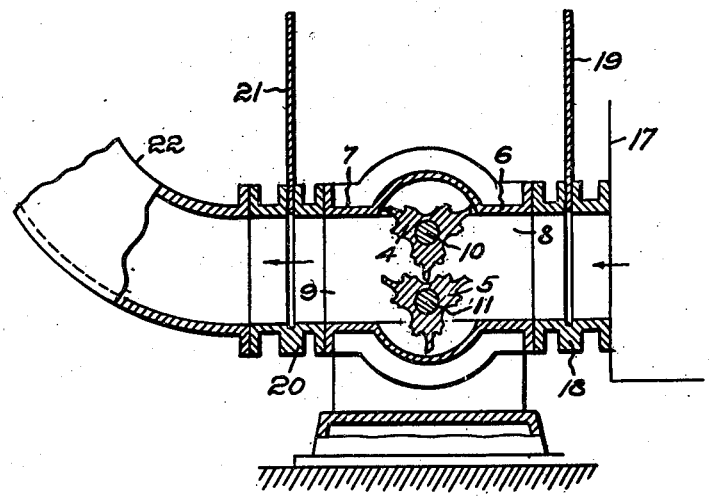
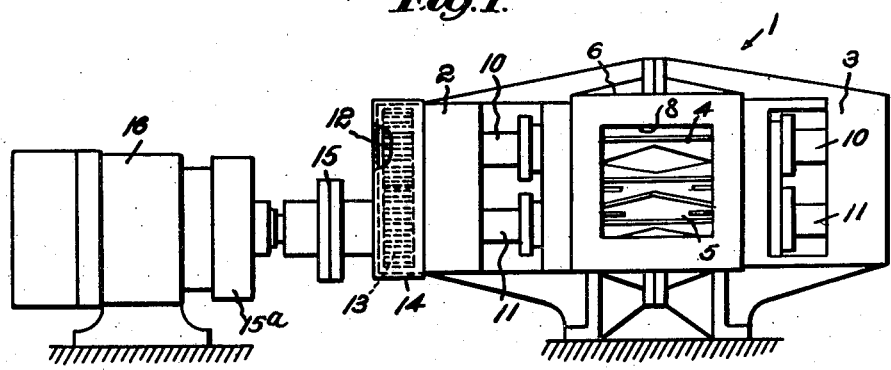
Inventor:
Ernest P. Cook,
by Emery, Booth, Townsend, Miller & Weidner
Attys

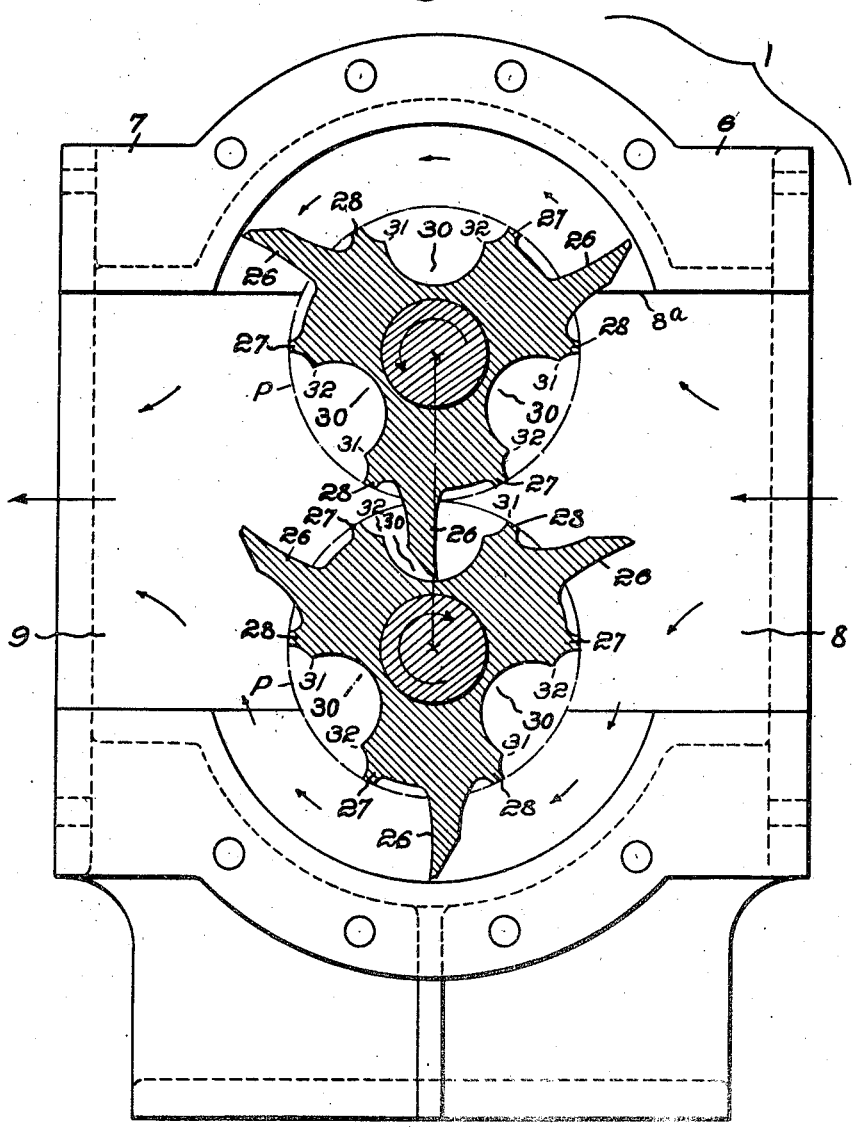

Feb. 1, 1949.  E. P. COOK  2,460,278
ROTARY PUMP FOR THICK FIBROUS SUSPENSIONS
Filed Feb. 4, 1944  10 Sheets-Sheet 4
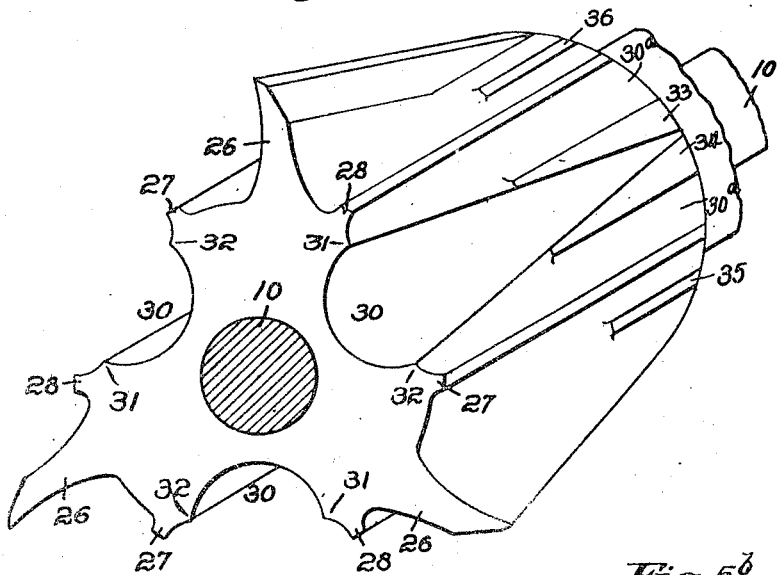
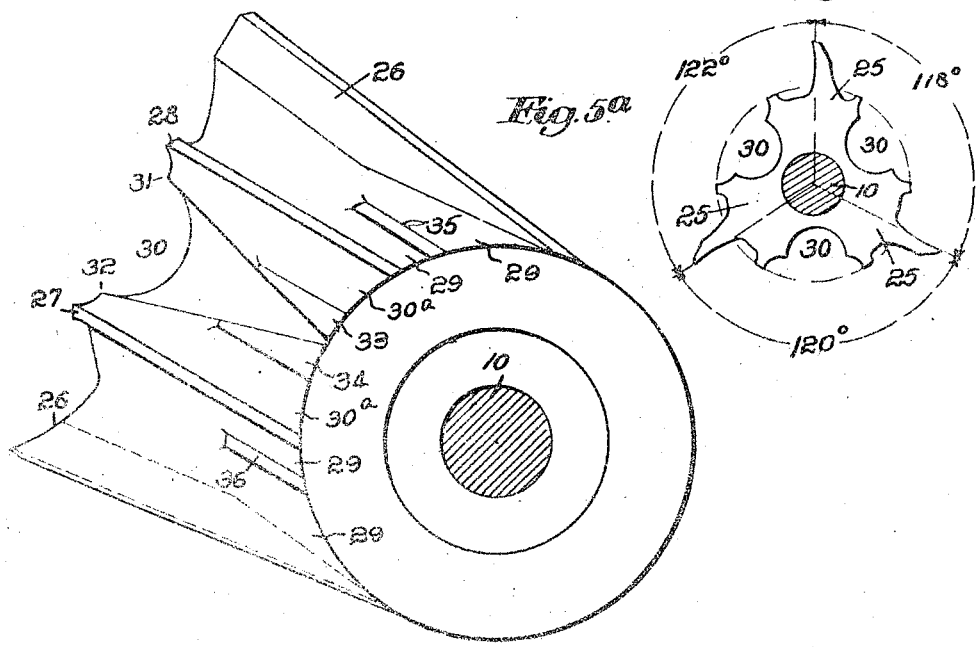

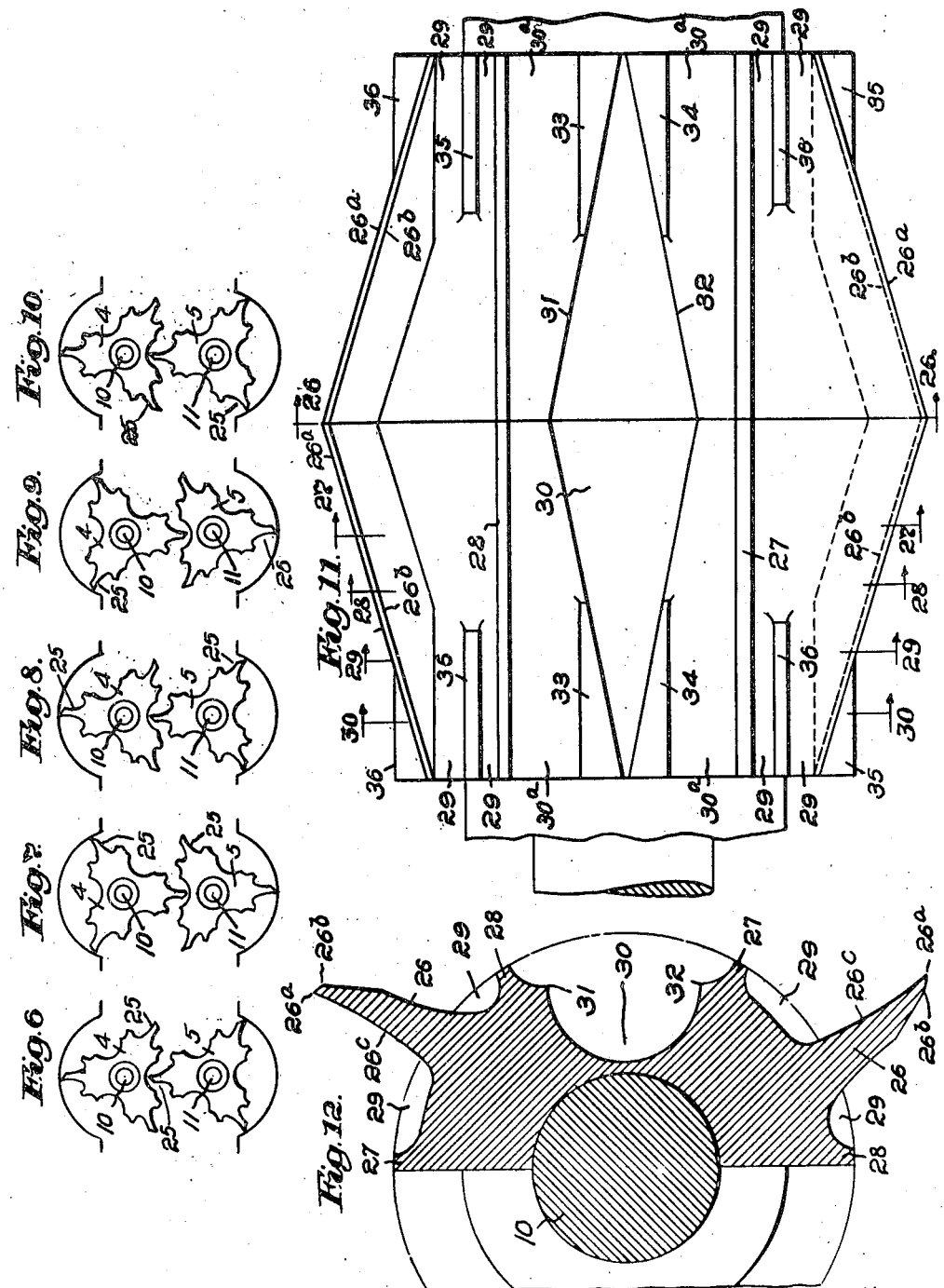

Feb. 1, 1949.  E. P. COOK  2,460,278
ROTARY PUMP FOR THICK FIBROUS SUSPENSIONS
Filed Feb. 4, 1944.  10 Sheets-Sheet 7

Inventor:
Ernest P. Cook,
By Emery, Booth, Townsend, Miller & Widner
Attys.

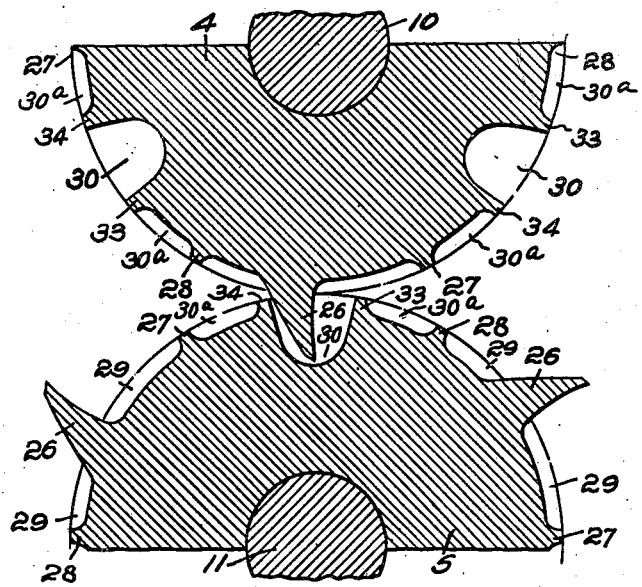
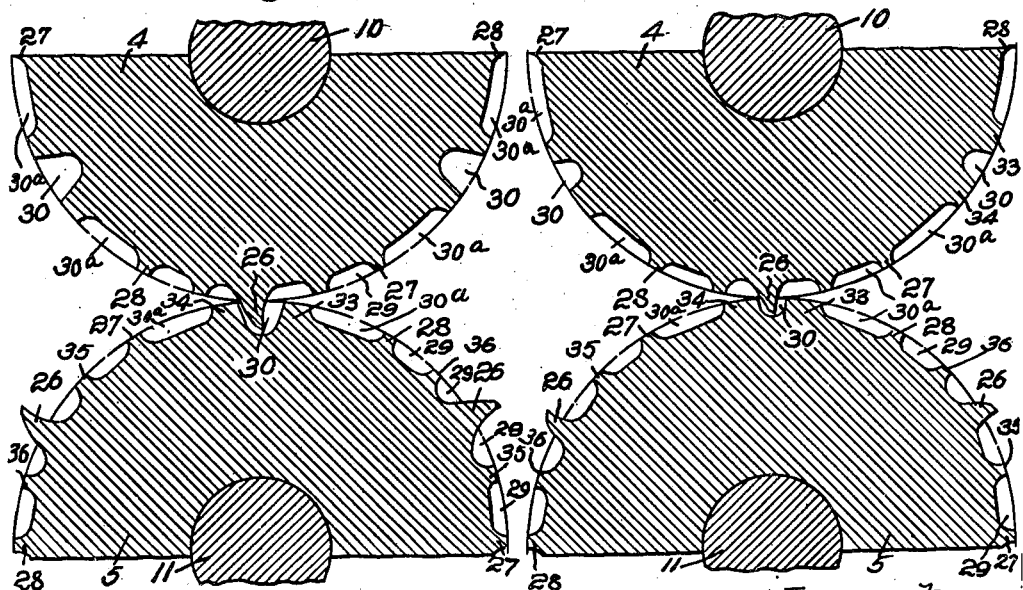

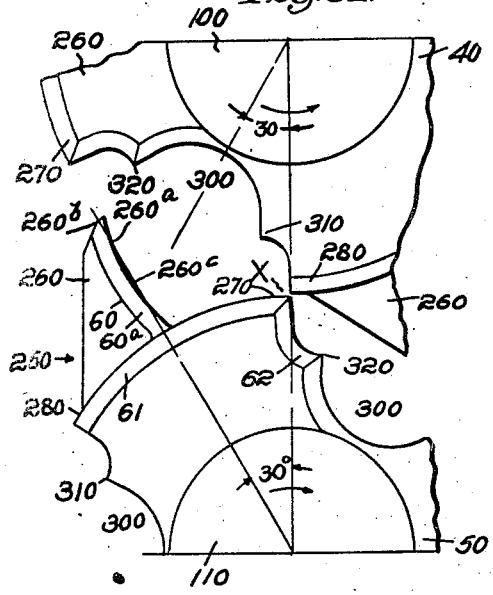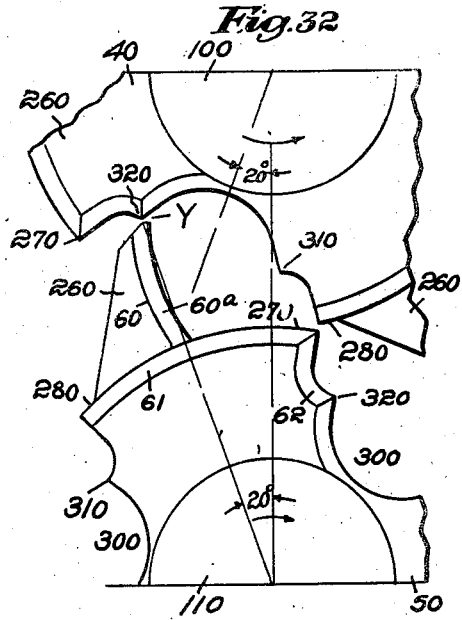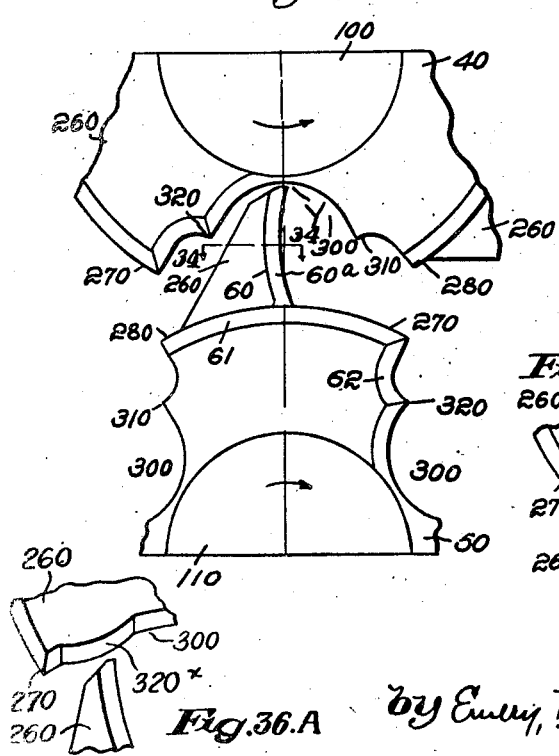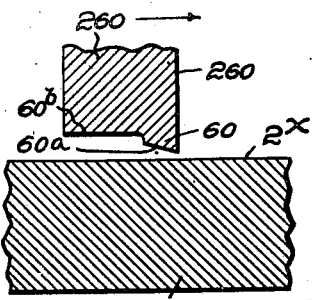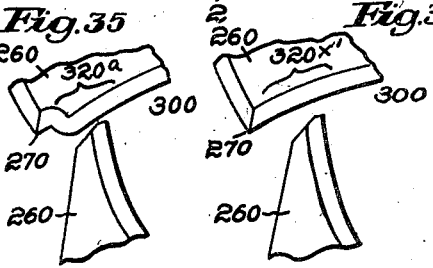

Patented Feb. 1, 1949

2,460,278

UNITED STATES PATENT OFFICE 2,460,278

ROTARY PUMP FOR THICK FIBROUS SUSPENSIONS

Ernest P. Cook, Berlin, N. H., assignor to Improved Paper Machinery Corporation, Nashua, N. H., a corporation of Maine Application February 4, 1944, Serial No. 521,109

36 Claims. (Cl. 103—126)

My present invention concerns the transfer of fluids, especially cellulose pulp and like fibrous suspensions, as for example to and from vats, tanks or other vessels and containers for the fluid supply, or through a number of them. Such fluid transfer may be direct from a supply to a delivery location, or the fluid may be drawn or advanced via conduits, pipe lines and the like of requisite extent, for discharge to atmosphere or otherwise under volumetric control.

More particularly the invention has as a main object the controlled displacement pumping of paper pulp stock and other cellulosic fibrous and like suspensions up to and including those of a higher consistency or spissitude, as represented by the percentage of fibrous or like solid content, than have heretofore been regarded as transferable in such manner.

While thus the invention is primarily concerned with displacement pumping and flow of fibrous suspensions at relatively high consistencies, particularly thick cellulose pulp or stock of wood or other derivation and like fibrous fluids as encountered in the pulp and paper industries and those dealing with fibre liberation and treatment, the means and methods of the invention as herein disclosed are equally adapted for handling such suspensions in any of the lower ranges of fibrous consistence, as well as certain liquids with little or no fibrous or other solid content.

A further important object of the invention is the provision of a pump for the purposes stated so constructed and arranged that it cannot become airbound.

Attendant on these and other objects and advantages which will be apparent from the following description, the invention more specifically presents improvements in the field of rotary-piston displacement pumping including means whereby such type of pump is efficiently adapted to the uses stated.

In the drawings illustrating by way of example certain embodiments of means of the invention and by which its method or principle may be practiced.

Fig. 1 is an elevation of a pump unit including a directly coupled source of power;

Fig. 2, mainly in vertical section, shows a typical installation of such pump;

Fig. 3 is a section on a larger scale, taken substantially centrally through the pump housing, transverse to the axes of the rotary pistons or rotors;

Figs. 5 and 5a are isometric perspective views of longitudinal halves of one of the rotary pistons, viewed oppositely;

Fig. 5b is a partly diagrammatic end or sectional view of a single rotor illustrating a modification;

Figs. 6 to 10 are a series of partly diagrammatic cross-sectional views progressively representing relative angular positions of the rotor pair, advanced 60° in each succeeding figure;

Fig. 11 is a top plan of one rotor, on a larger scale than Figs. 3 and 4;

Fig. 12 is a view partly in end elevation and partly in central cross-section of one of the rotors and corresponding to Fig. 11;

Figure 13:
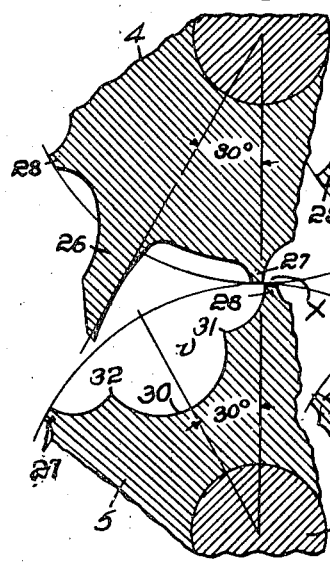
Figure 24:
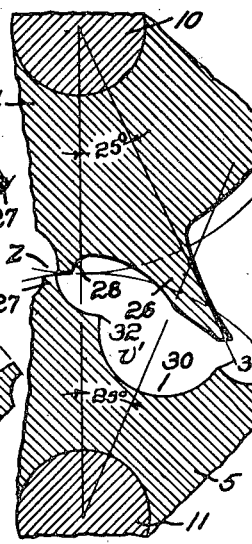
Figure 25:
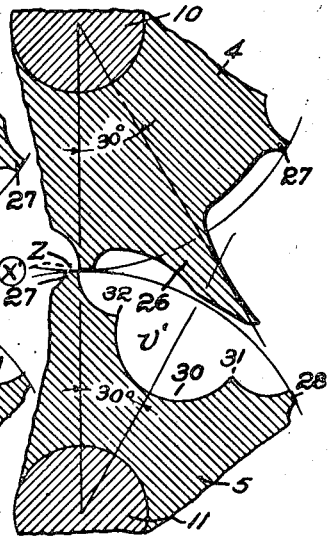

Figs. 13 to 25 are a further progressively related series of views, upon an intermediate scale, illustrating the interaction of a blade of one rotor and a valley of the other, the serial views being successively angularly spaced by 5° increments, starting in Fig. 13 at a position 30° before or to the left of the zero or "line of centers" position (Fig. 19) and running to a position in Fig. 25, 30° after or to the right of such zero position;

Figs. 26 to 30 are a further series of cross-sectional views, on a similar scale as Figs. 11 or 12, with the rotors in the same relative angular position (a zero position) in each view of the series, the sections being taken at different lengthwise-spaced transverse planes along the rotors, starting at midlength and progressing toward one end, substantially as upon the section lines 26—26 to 30—30 of Fig. 11;

Figs. 31 to 34 illustrate another embodiment of the invention, Figs. 31, 32 and 33 being end elevations of coacting portions of the rotors and Fig. 34 being an enlarged section substantially as on the line 34—34 of Fig. 33; and Figs. 35, 36 and 36A, each corresponding to rotor portions as at the upper left in Fig. 32, illustrate a manner of clearance control as appropriate to different operating circumstances.

An understanding of the invention and of the problems involved will be aided by the following general considerations. In the pulp and paper-making and allied industries, by way of example, fluid pulp or stock under present practice is advanced for treatment or between various treatment stages in a comparatively dilute and distinctly liquid condition, that is, at consistencies as to fibre content generally not more than about 4–6% by weight a. d. b. (air-dry basis; for bonedry or oven-dry basis multiply by 0.9, e. g. 6% a. d. b.=5.4% b. d. b.).

At greater than about 6% consistency, such as 8-10% consistencies or higher, pulp or thick stock has been progressed, if at all, other than by gravity generally aided by gaseous pressure, by some form of conveyor means such as feed screws or worms and devices of the screw propeller type having angularly bladed thrust members with axes paralleling the path of advance. Such prior types of conveyor or progressing means are extremely inefficient, being commonly subject to slippage factors above 90% and as high as 98 to 99%, with proportionately excessive power consumption and wastage. Further, they are unsuited for handling the lower consistencies of pulp and stock, because of their inherent wide and irregular volumetric variation at different consistencies of liquid matter while operating at a given constant speed. Other objections in such prior devices are the large metal surface areas directly contacting the pulp, and the resultant hydrating and other undesired effects upon the fibers, making them difficult or unsuitable for various subsequent treatments. It will be appreciated that at the poor efficiencies as referred to the waste power goes into working the fibers, and that the more the pulp is broken down mechanically in conveyance, the less latitude remains for working or treating it under controlled conditions as desired.

The construction of pumps for flowing wood pulp has always been met by difficulties when the percentage of the pulp in liquid exceeds 4-5%. While efforts have been made to employ centrifugal or velocity pumps for the purpose, these have been found impracticable due to the high speeds and great power consumption, and owing to the centrifugal and other velocity effects upon the fibrous suspension, tending to separate the solid and the liquid content, with hydrating and other changes in the fiber inconsistent with later treatment and conditioning desired for it. Attempts have also been made to adapt reciprocating piston pumps to use with pulp suspensions, but these so far as I am aware have not successfully handled stock materially in excess of about 6% consistency, and have proven unsatisfactory due to the considerable number of mechanical parts and special and complicated valve mechanism involved, presenting difficulties in operation and maintenance. Further, in most such prior devices the power requirements have been excessive.

For the purposes of description of the invention and its objects it will be understood that at atmospheric pressure a pulp consistence in the vicinity of 6% a. d. b. represents about the border line between liquidity, on the one hand, and a condition of non-liquid but fluid suspension, with reference to typical cellulose fibrous pulp. For example, a mass of pulp stock at 6% consistency (containing 94% water) will when scooped in the palm of the hand fluently discharge considerable water. At about 8-9% consistency, the similar stock when thus picked up will drip little if any water without subjection to pressure. It definitely is not a liquid but is a suspension which is fluid, at least under pressures of a few pounds per square inch and upwards. The percentages as here stated are approximate or average and vary somewhat with the character of the fibre and its source, as whether from wood, or a particular variety of wood, or from one of the grasses, canes, bamboos or other source for cellulose fibre, to all of which the invention is applicable.

Because of the inherent difficulty in handling high-percentage fibrous pulp and like suspensions, it is the common practice to dilute or thin them for the purpose of circulation or progress along a path of flow. Usually they are conveyed, with the addition of water or other liquid, in the low range of about 3-6% consistency. After transfer they are returned to a higher consistency by draining, screening, drying or other thickening operation. This entails considerable additional equipment, slows down the processing as a whole, and adds to the number of operations at which the fibrous material is subject to disturbance and potential injury or undesired modification including particularly the loss of fiber, a most important consideration. A further and frequently even more serious objection is the consumption of power and the loss or expenditure of heat as attendant on the treatment of the fibrous stock at say 5% consistency as compared with say 10, 12 or 15%. At 5% there are 19 lbs. of liquid to 1 lb. of fiber a. d. b. At 10% there are but 9 lbs. of liquid per 1 lb. of fiber, at but 7.33 lbs., while at 15% consistency the liquid to fiber poundage ratio lowers to 5.66. Thus for every 100 lbs. of fiber in a pulp suspension at 5% consistency 1900 lbs. of liquid or 2000 lbs. of the mixture must be heated or otherwise treated, whereas for the same weight of fiber (100 lbs.) in suspension at 15% consistency only 566 lbs. of the liquid or 666 lbs. of the mixture is to be heated for the corresponding treatment of the fibrous content. Hence it is evident that provisions for efficiently pumping thick pulp stock, at consistencies in excess of 5-6%, so that it may be progressed and treated in bleaching, dyeing and other operations at such relatively high consistencies, afford opportunity for substantial saving of fuel and power, with corresponding cost reduction.

Such provisions, as already pointed out, are a major object of the present invention, the pump mechanism of the herein disclosed embodiments of the invention being novelly constructed and arranged with particular reference to flowing high-consistency cellulose fibrous suspensions and like fluid masses in a substantially continuous stream along a desired path, which may be confined as in a pipe line, or otherwise, including movement or circulation to, from or within a receptacle or vessel or through a plurality of them in series, parallel, combined series and parallel or other desired arrangement. Since the material thus flowed may be discharged to or taken from vessels under pressures above or below atmospheric the pump of the invention is susceptable of a wide range of use in connection with the processing of fibrous materials including continuous systems therefor.

Accordingly, the structural embodiments of the invention herein illustrated as typical means for practising the methods involved comprise novel rotary-piston pump apparatus characterized by a capacity to advance fibrous fluids and suspensions of high consistency, as well as those of less fibre content, under most head conditions likely to be met in the pulp and paper industries, including those in the range of 100 to 125 feet or more, and further characterized by a controlled displacement of positive type.

Figure 4:
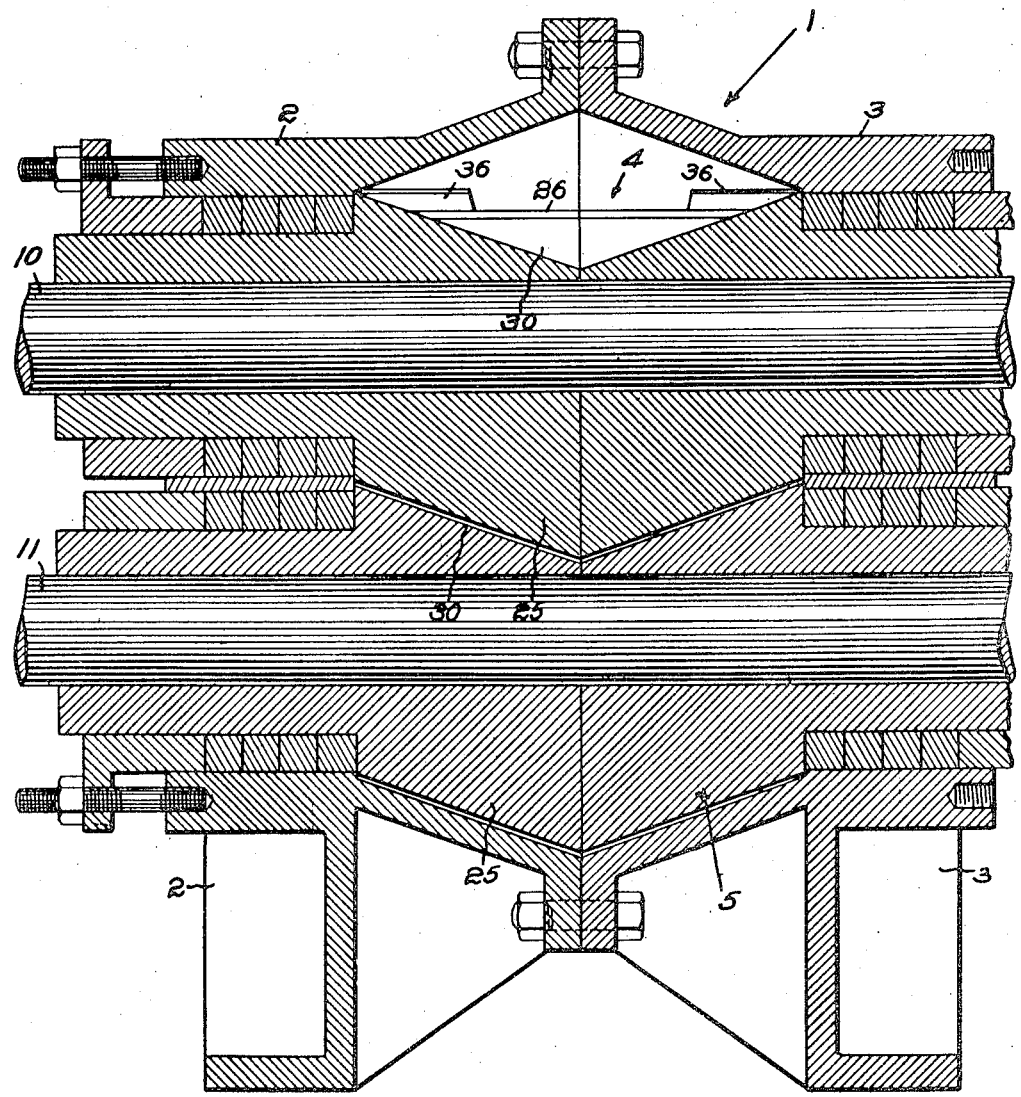
Fig. 4 is a longitudinal section on a similar scale as Fig. 3, taken at right angles to the latter, in the plane of the rotor axes.

Referring to the drawings in more particular, and first to Figs. 1 and 2, the pump housing is indicated generally at 1, including opposed end base members or castings 2, 3 supporting between them the cylinder or case proper defining the chamber for the rotary pistons, rotors or displacer and seating elements 4, 5. In the example illustrated the pump case comprises vertically separable members, see also Fig. 4, oppositely disposed to provide for the pump an inlet or suction side 6 and an outlet or pressure side 7 and together presenting the intake port and region 8 and the discharge port and region 9. The pump may be operated in any convenient position with respect to the location of the intake and discharge ports and the general line of flow between them. While here shown with the flow path horizontally through the pump case and the rotor axes accordingly spaced vertically, the pump unit as a whole may be turned 90° vertically in either direction from the position as in Fig. 2 or to any intermediate position. Thus such terms as upper and lower, or top and bottom as may herein be used with reference to the rotors and their associated casing portions are merely for identification and convenience in description and without limitation as to any particular operational position.

The rotary pistons 4, 5, hereinafter generally called the rotors, are respectively fixed on shafts 10, 11 journalled in suitable bearings on the casing members 2, 3. These rotors may be constructed integrally with their shafts or separately and each themselves of one piece or in two or more sections.

As one end of the housing the shafts 10 and 11 are extended to receive the respective synchronizing drive gears 12 and 13, these desirably being enclosed in a housing extension or cover plate 14. Either shaft may serve as the power receiving and transmitting element, herein the lower shaft 11 being projected for connection as through a coupling 15 and reduction gearing 15a with the power source, represented as an electric motor 16, for which may be substituted a belt, chain, gearing or other drive connection with a prime mover. The housing or case incorporates suitable packing for the respective ends of the rotor shafts, as seen for example in Fig. 4.

A typical installation of my pump means is shown somewhat diagrammatically in Fig. 2, where 17 indicates a stock vat, tank or other receptacle or vessel from which the fluid stock of whatever fibrous consistence is to be forwarded to another more or less remote point not accessible to it under mere gravity flow. The pump unit as there represented has its intake port 8 connected with the supply outlet as through a valve 18 having a shut-off gate 19. Similarly the discharge port 9 communicates through a valve 20 and gate 21 with the elbow or other receiving terminus 22 of a conduit, a pipe or like feed line.

The general structure and the operative principle of the pump means of the invention will now be described, with more particular reference to Figs. 3, 4, 5 and 5A and the series of small sectional views Figs. 6 to 10. The latter, together with Fig. 3 represent one full 360° rotative cycle of the rotor pair, through progressions of 60° each, Fig. 3 being taken as the 0° and the 360° positions. Since the two rotors 4 and 5 preferably are identical, similar reference numerals are applied upon each of them.

While these rotors are susceptible of embodiment in various symmetrical or other forms, as to their number of co-active vane and valley elements, they are illustrated in the preferred triple form. Each as shown comprises three radiant vanes 25 and a like number of intermediate vane-receiving valleys 30. The angular spacing in the illustrated example is 120° between the central radii of like elements of the given rotor, each vane and each valley occupying 60° of arc. Because in accordance with the invention the male elements or vanes 25 are relatively thin and sharp-edged at their outer ends they will hereinafter generally be termed blades, by way of contrast to lobes and like rounded formations characteristic of pumps of the "Roots" and similar types.

The two rotors 4, 5 are relatively positioned and so synchronized by the described gearing 12, 13 that the blades 25 of one rotor enter and pass through the valleys 30 of the other mutually and in alternation. That is, a blade of one rotor traverses a valley of the other alternately with respect to the particular upper or lower rotor, first a blade of one entering and passing through a valley of the other, and next a valley of the first receiving a blade of the other. Thus while the triple blade and valley elements 25 and 30 of the individual rotors are themselves angularly spaced 120°, a relation of central radial alignment of the blade of one of the valley of the other, or what I will refer to as an on-center or zero position of the two, occurs once in every 60°, when a blade summit or tip of one rotor and a valley low of the other mate at the region of the common radial plane containing the rotor axes, as for example at the central portion of Fig. 3.

In the representative embodiment in the drawings the rotor blades and likewise the valleys are uniformly spaced, as is generally satisfactory. In some instances, particularly when operating with the higher consistencies of fibrous stock and under relatively high pressures, as for example in the range of about 60 lbs. per sq. in. and over, or under equivalent heads of 135 to 140 ft. or more, some vibration may occasionally develop in the discharge line near the pump, possibly due to small variations from absolute uniformity in the flow. To avoid setting up harmonics in the piping under such conditions, a slightly uneven spacing of the rotor elements may be employed, as for example 118°, 120° and 122°, in a three-element rotor. Any vibration such as referred to is then uneven, thus preventing the forming of harmonics such as referred to; see for example Fig. 5b.

Figure 26:
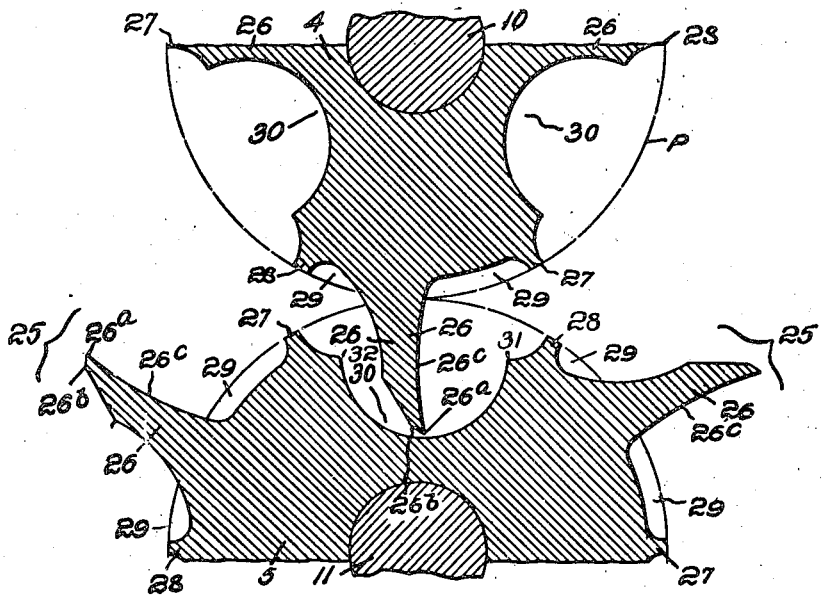

Referring now more particularly to Fig. 26, which corresponds, on a somewhat enlarged scale, to the central portion of Fig. 3, each of the male elements 25 in the illustrated example comprises a main radial member, blade or fin 26, having an angularly extensive base portion rooted within the circles P, see also Fig. 3, and Figs. 13 to 25, described about the rotor axes on radii of one-half the distance between them. These circles are imaginary save at the extreme ends of the rotors. They will be termed the pitch circles, but in this connection it is particularly emphasized that as an important aspect of the invention the rotors are so constructed and arranged that there is no rolling or other contact or direct radial opposition of any rotor surface portions which are coincident with the pitch circles.

Laterally or angularly spaced ahead of and behind each blade proper or fin 26 are leading and trailing shoulders 27 and 28 respectively, constituting material-separating and closure or sealer means. They are of a radial height so as to terminate at or adjacent the pitch circle P of their rotor and are formed with well-defined sharp or angular edges or outer corner portions at least at their leading sides and preferably at both the latter and their trailing sides, substantially as illustrated. These auxiliary blade members or shoulders 27, 28 are of limited angular extent in or adjacent the pitch circle, equivalent to but a few degrees of arc, generally not more than about 5° and preferably approximately but 2° to 3°. Their outer faces desirably are planar, along short chords subtending said limited arcs of the pitch circle, but in some instances may be curved or arcuate.

Behind the leading shoulders 27 and in advance of the trailing shoulders 28, between each of them and the base portion of the corresponding main blade member or fin 26 each of the male elements or blades 25 regarded as a unit are distinctly relieved, to a maximum radial depth inwardly beyond the pitch circle P generally approximating the width of said shoulders. This depth may be selected with reference to the character and maximum solid or fibrous consistency of the suspension to be pumped. Said main blade members 26 are tapered at their outer portions, reducing them circumferentially to a tip and leading edge portions 26a, Fig. 26, approximating a knife-edge formation. Rearwardly thereof the adjoining narrow end face 26b is relieved somewhat obliquely, disposing it at an angle to the chord subtending the short arc of casing wall opposite said end face, and affording a predetermined increasing clearance rearwardly of the tip 26a. While the blade end surface portion at 26b may be somewhat curved or arcuate, any substantial area of direct radial opposition or near surface contact desirably is avoided between the ends of the blade members 26 and the casing, as well as between them and the walls of the rotor valleys 30.

The terms leading and trailing or front and rear relate to the direction of rotation, which is indicated by the arrows on Fig. 3 adjacent the rotor axes, being opposite for the respective rotors. With reference to this rotational direction, it is to be noted that the thrusting flank or face 26c (Fig. 12) of each main blade or fin 26 is disposed generally radially of the rotor, approximately on a radial line intersecting the narrow outer peripheral face 26b of the blade, about centrally of said face, somewhat behind its advancing tip or edge portion 26a. The latter accordingly has a forward angular extent beyond this radius, affording it somewhat of a hooked or raked nature. This radial line at the leading face of each blade member 26 is central of the corresponding blade 25 as a whole, being the same radius previously referred to as defining the central or zero rotor position when coincident with the line joining the rotor centers, as seen at the central portion of Fig. 3 with respect to the then bottom blade of the upper rotor 4.

Preferably, and as illustrated, the leading faces or thrust flanks of the blade members 26 are non-planar, departing sufficiently from a true radial plane as to make them somewhat concave or dished as at 26c, away from the direction of advance along a curve extending substantially uniformly from the blade edge or tip 26a to the root of the given blade member 26 within the pitch circle P. By reason of the described formation the fibrous suspension opposed by these faces 26c is subject to a force component tending to urge or roll it radially inward and away from the casing wall. Objectionable gathering of suspension fibers at the outer ends of the blades or between them and the casing is thus correspondingly reduced. The previously described recedent formation of the circumferentially limited outer end blade faces 26b, providing rearwardly widening spaces between them and the casing, cooperate to and in further contribute to the clearing action adjacent the casing. As later herein more fully explained with reference to the clearance provisions, the manner of sealing or barrier formation and the actions of shearing or scuffing separation of the fibre mass, some limited quantity of the latter may be utilized at the blade tips for said purposes. This however is importantly distinguished from matting or cumulative compaction of increasing quantities of fibrous matter at the region of the casing surface and the outer ends of the rotor blades, or between the latter and the valleys. Any such latter formations soon result in clogging and plugging, which herein is positively avoided, regardless of the fibrous percentage of the particular suspension being pumped.

From the foregoing it will be understood that in the illustrated examples the blades or blade units 25, three to each rotor, each comprise a main asymmetrical blade member 26 with a generally radial thrust flank 26c, substantially central of the blade unit, together with two auxiliary members or shoulders 27, 28 respectively ahead of and behind the main member; each blade 25 as a whole has its root within the pitch circle, has portions 29 to each side of the main members 26 which are spaced inwardly from the pitch circle and has beyond each such portion 29 the respective shoulder members 27, 28 terminating not beyond the pitch circle and of calculated limited extent along the latter. Each such compound blade 25 occupies a degree of arc of the total rotor circumference equal to 360° divided by 2n, where n is the number of blades; in the illustrated embodiment 360° divided by 3 times 2 gives 60° for each blade. The same also applies to the valleys 30 now to be further described. It is here again noted that various modifications may be made within the scope of the invention, as for example relative to the angular spacing of the blade and valley elements as referred to in connection with Fig. 5b.

Each valley element 30 as here shown in the main views comprises that 60° segment of rotor between the radius at the rear edge of the trailing shoulder 28 of a given blade and the radius at the front edge of the leading shoulder 27 of the blade next following. These valley elements lie wholly within the pitch circles, which they approach or intersect at their leading and trailing or blade-entrance and blade-exit ends.

The several valleys 30 as viewed in section at mid-length of the rotors, see particularly Fig. 3, consist of curved-wall concavities of major depth at their central portions and rising to or substantially to the pitch circle at the respective ends with increasing abruptness. For facility in manufacture they desirably are symmetrical and are so shown in Figs. 1 to 30 but they may differ in contour as between their entrance and exit portions. In the Fig. 3 construction each valley 30 is formed with protuberant ridges 31 and 32, on their leading and their trailing wall portions respectively. These rib-like projections each rise to a crest or peak, in this instance distinctly sharp or angular, from which crest each ridge slopes off at both sides along curves merging into the valley wall. Adjustments as to these elements are later referred to in connection with Figs. 35 and 36. These longitudinal raised formations are located nearer to the lateral boundaries of the valleys than to the valley bottoms, and in effect define in the valleys minor lateral portions at the entrances to and exits from the main central valley portions, facilitating transit of the blades through them with minimum interference from the fibrous content of the fluid at this important region of the shifting seal line between the suction and the pressure sides of the pump. And as will be apparent from a consideration of subsequent figures these valley ridges or ribs with their sharp crests importantly cooperate with the blade tips to separate the stock mass, as distinguished from severance of individual fibres, by a shearing action as a blade enters a valley. Supplemental sealing ribs or bosses 33, 34 in the valleys at end portions adjacent the outer ends of the rotors are later more fully described in connection with Figs. 28 to 30.

Turning now to the series of partly diagrammatic views, Figs. 13 to 25, these represent in angular steps of 5° each the progressive interaction between two coacting rotor elements of the opposite type, a blade of one and a valley of the other, in the course of entrance, traverse and exit of the blade relative to the valley during a complete 60° phase of such movement, such as successively takes place at the central inter-axis region, where the pitch circles are tangential; see the central portion of Fig. 3.

The rotors revolve oppositely, in the direction of the arrows adjacent their axes in Fig. 3, and the flow direction is from right to left in said figure, via the opposite outer portions of the rotors, as indicated by the larger arrows. But the interpassing blade and valley parts in Figs. 13 to 25, being at adjoining inner sides of the rotors, move from left to right, reversely to the flow direction. Figs. 13 to 18 may be referred to as the approach, entrance or "left" positions, that is, ahead of and to the left of the Fig. 19 zero position. Similarly, the Figs. 20 to 25 are the recedent, exit or "right" positions.

From a comparison of this view series with Fig. 3 and with the Fig. 6 to 10 series of small views of the complete rotors, it will be understood that in the 30° right position of Fig. 25, the next following interactive blade and valley pair, in this instance a valley of the upper rotor and a blade of the lower one, has arrived at a 30° left position corresponding to that of Fig. 13. That is, if Fig. 25 were extended to include 30° to the left of the zero or common radial line, an upper rotor valley and a lower rotor blade would be seen in the same relative positions as those of Fig. 13. Conversely, if Fig. 13 were extended 30° to the right of the zero line it would show an upper rotor valley and a lower rotor blade in the same relative positions as those of Fig. 25.

The diagrams of Figs. 13 to 25 accordingly illustrate one complete blade-and-valley transit or barrier cycle, such as recurs continuously in mutually alternating succession as to a blade of one rotor and a valley of the other. During each such transit the parts function to effect jointly a variantly located and angularly shifting barrier against back flow of the fluid from the pressure to the suction side of the pump.

Referring more particularly to Fig 13, the barrier against back-flow is there afforded by the maximum mutual approach of the leading corner of a front shoulder 27 of an upper rotor blade and the leading outer edge portion of a lower rotor valley 30, where the latter joins and in part defines the trailing corner portion of the rear shoulder 28 of a blade next to the right. An upper rotor blade 26 is about to enter the valley 30, the mouth or outer boundary of which may be regarded as defined by the lower pitch circle P. This barrier location or zone of sealing in Fig. 13 is indicated by the letter "X."

The parts are so shaped, proportioned and synchronized that there is no actual metal-to-metal or other self-material contact between the parts at any time. A calculated clearance is provided at the maximum approach positions of any of the parts, such as the shoulders 27, 28 at the barrier region X in Fig. 13. This applies also to the other maximum approach relations of the rotor parts as seen in any of the figures, including the relation between the blades and the circumferential wall of the casing. This deliberate clearance is calculated with reference to the nature and precentage of the fibrous content of the suspension and the maximum pressure differential under which it is to be pumped. As a general rule it is made of the order of at least 15 to 20 times the diameter of the average single fibre, fibre unit or bundle likely to occur separately in the given suspension, and generally is not more than about 20–30% of the length of the typical single fibre of the shorter varieties.

In this connection, it is important to note here that the invention takes advantage of the very presence of the fibrous content of the fluid to effect the desired barrier or sealing cut-off between the intake and output sides, both at the central region between the rotors and also between them and the surrounding casing wall. In other words, the invention directly avails of the pulpous mass of fibre content of the suspension to make is possible to subject the latter to controlled or substantially positive displacement pumping.

Heretofore, as previously explained, the fibrous matter has presented a serious obstacle to the successful pumping of suspensions thereof at consistencies appreciably in excess of about 6%. Most efforts along that line have adhered to the theory of tight-fitting parts and close-running surfaces, with resort to such expedients as resilient packing at the ends of rotor lobes. Discarding that generally accepted principle the present invention proceeds in a reverse direction. And by deliberately increasing clearance to controlled predetermined extents in a rotary-piston pump, together with the other novelly combined features of improvement as herein disclosed the invention has for the first time so far as I am aware made that type of pumping practicably available for the purposes here concerned.

Otherwise stated, the present invention is importantly associated with the discovery that the nature of fibrous cellulose pulp suspensions, at the consistencies here concerned, is such that a seal or barrier against backflow between relatively moving parts is best had, consistent with free running of the pump at acceptable efficiencies, by the provision of a predetermined controlled clearance, in combination with rotor and casing structure as herein disclosed. Instead of increasing slippage as might be expected, the controlled clearance formations of the pump rotors in combination with the other structural features thereof as herein illustrated and described utilize the mass-forming tendency of the suspended fibres to create a closure or dam at the minimum clearance regions, adequate to control backflow between the rotors, and between either rotor and the casing, while allowing the parts to run freely and with economy of power. This is not to say that slippage is zero or efficiency 100%. Heretofore, however, rotary piston pumps, as contrasted with screw propellers and like axial flow devices, have clogged and entirely failed of operation with fibrous suspensions at any such consistencies as here made possible to handle, while on the other hand such propellers and conveyors if used for thick pulp stock have operated only with slippage factors of 90% and upwards and hence have been extremely wasteful of power in addition to other objections as previously noted. In contrast with such prior practice, any slippage in the pump of the present invention, which is relatively low even in the higher pressure ranges of 60# per sq. in. and over, is a minor consideration in the face of the result accomplished, namely, the controlled-displacement rotary-piston pumping of high-consistence fibrous suspensions, with a minimum working of the fibres and the attendant economies and other advantages as already explained.

Accordingly wherever herein the pump is referred to as having a substantially positive, semi-positive or controlled displacement it is meant that the action is comparable in this respect to that of existing rotary piston pumps as heretofore applicable for use only with liquids or with low-consistence suspensions of a distinctly liquid character; that is, the volumetric displacement is positive or substantially so in the sense that measured and controlled quantities of the high-consistence suspensions are efficiently pumped, under whatever pressure differential within its designed limits a given pump is to be operated. Further, such slippage as may occur, while subject to some variation at different heads, is substantially constant for any given head or pressure differential.

Referring again to Fig. 13, and to the barrier region X, it will be seen that in this maximum approach position of the shoulders 27, 28 they are angularly offset or staggered, with only their respective leading and trailing corner portions in or contiguous to the common radial line between the rotor axes. Thus, even as to these parts, which are the only ones having circumferential surfaces lying along or adjacent the pitch circles, excepting the supplemental members such as 33 to 36, Fig. 11 and Figs. 27 to 30, to be described, there is no direct radial opposition of such surfaces in their relative positions of minimum clearance. This feature further contributes to the capacity of the pump to handle suspensions of high fibre consistence, since there is thus total avoidance of closely opposed surfaces in the region of the pitch circle meeting, such as would have the same angular velocity and would have rolling contact or near contact without relative angular movement between them. Hence there are no radially opposed surface areas at the regions mentioned upon which fibrous matter might accumulate and create distorting stresses at the rotor axes, such as have heretofore been fatal to satisfactorily maintained operation of rotary pumps in the presence of any substantial fibre content in the liquid or fluid.

For the purposes of comparison with the other views of the series Figs. 13 to 25, it is observed that in the 30° left position of Fig. 13 the location of the sealing barrier X is on or substantially at the common or central radial plane of the rotors.

Figure 14:
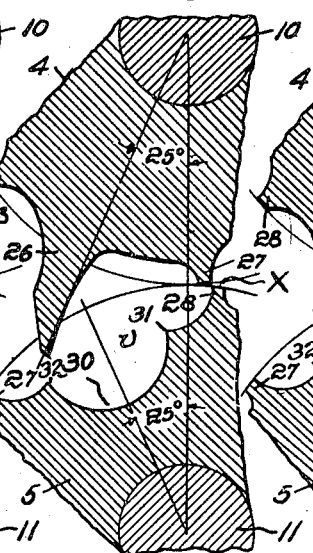

Progressing now to the 25° left position, Fig. 14, the barrier action is still maintained by the same parts, at the position X. The tip of blade 26 has entered the valley 30, regarding the latter as outwardly defined by the pitch circle P. It will be noted that the rearwardly communicating opening between the tip of blade 26 and the rear ridge 32 of the valley 30 has been narrowed to about half, as compared with Fig. 13. While the space defined by the blade and valley parts to the left of the barrier X, indicated by the letter $v$, has decreased as compared to Fig. 13, any incompressible suspension matter within this space is afforded ready escape at the opening mentioned, rearwardly or to the left (actually in the direction of flow through the pump). In Fig. 14 the location of the barrier X has shifted to the right of the central plane.

Figure 15:
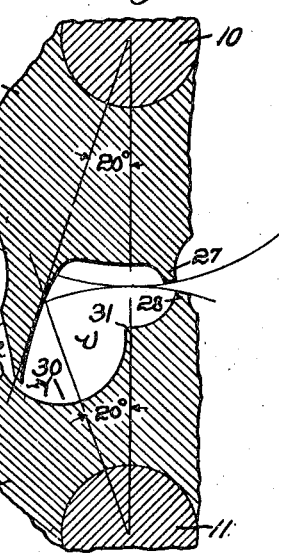

Continuing through a further 5° increment of angular progression, Fig. 15 illustrates that the back-flow barrier, here indicated at Y, has been transferred from its former location at the leading boundary of the space $v$, to the rear of such space, and distinctly to the left of the central plane. Here it is accomplished by the adjacency of the tip of blade 26 and the valley ridge 32. At the right, the previous blocking action at the shoulders 27 and the leading valley wall portion has been broken, said parts having mutually moved apart both angularly and radially, so as to afford an adequate escape aperture for the fluid within the decreasing space $v$.

In Fig. 16 the barrier Y again is furnished by the blade 26 and the opposite valley wall, at a location thereon near the inner base of the valley ridge 32. The blade 26 and a valley wall portion continue as the means forming the barrier at Y throughout the subsequent 5° angular progressions of Figs. 17 and 18, the central or 0° position of Fig. 19, and thence through the first three right positions, Figs. 20, 21 and 22.

Figures 16, 17:
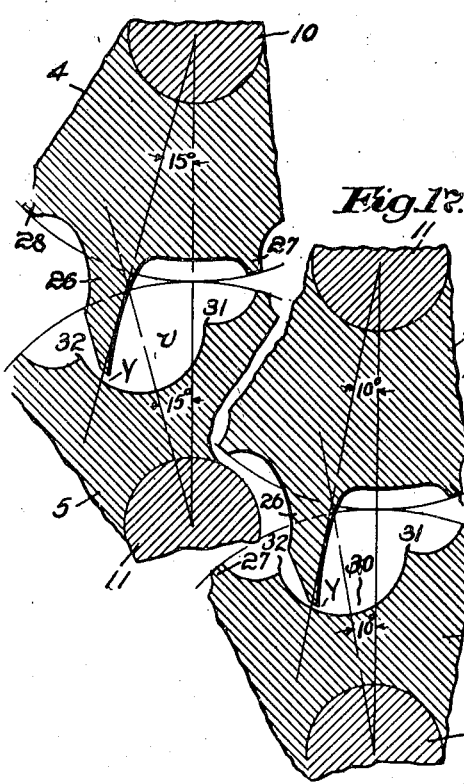
Figure 18:
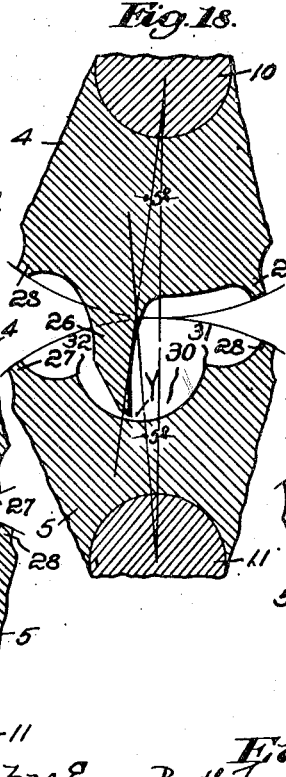
Figure 19:
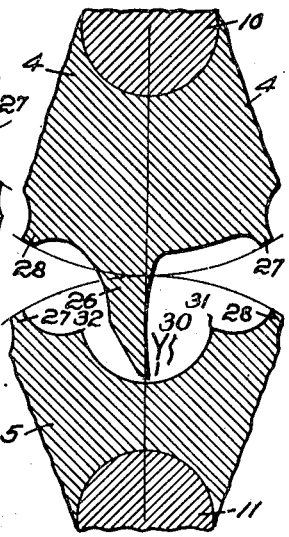
Figure 20:
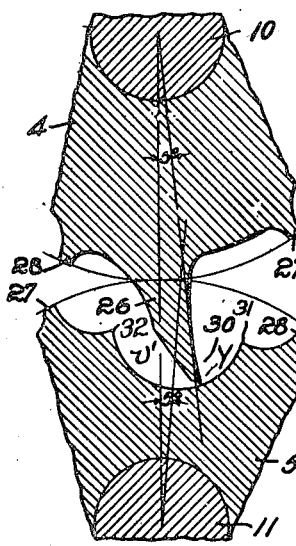
Figure 21:
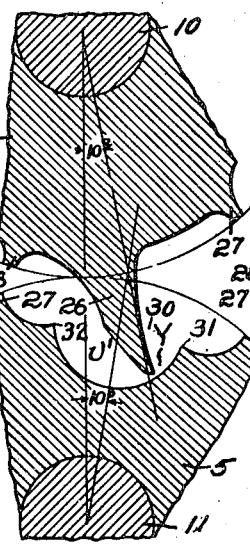
Figure 22:
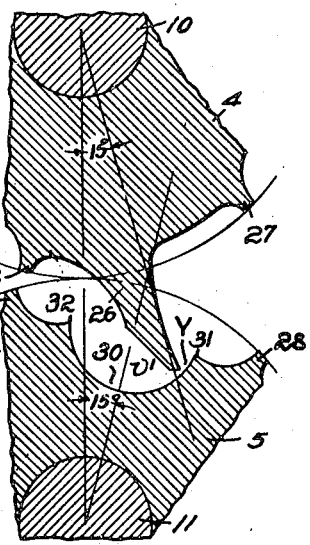
Figure 23:
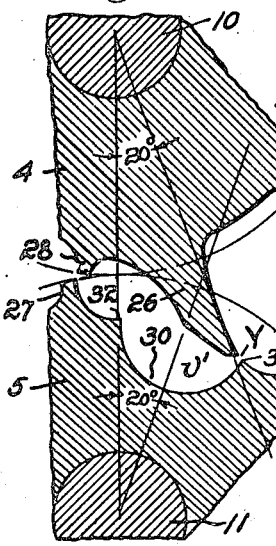

Through said Figs. 16, 17 and 18, the barrier region Y moves progressively toward the central plane, reaching substantial coincidence with it in Fig. 19, then passing to the right of it in Figs. 20, 21, 22 and 23, to increasing extents. It will be noted that the opening at the right of space $v$ continuously widens to a maximum in Fig. 19. From there on an increasing space $v'$ begins to form behind the blade and the opening or avenue of escape for the fluid therein is to the left, until 25° right position, Fig. 24, is reached.

Figs. 24 and 25 may be regarded as the converse of Figs. 14 and 13 respectively. As between Fig. 23 and Fig. 24 the barrier is transferred back to the left of the central plane, to the location Z. Here it is provided by the trailing wall portion of the valley 30, where the latter meets the shoulder 27 of a next following blade element, and the rear corner of the trailing shoulder 28 of the upper rotor. The opening from the space $v'$ simultaneously shifts to the right. In Fig. 25 the barrier, as at Z, again is at the central plane. It is here designated as X', as an indication that here the action may also accurately be regarded as the initial barrier position at the start of the next following blade-and-valley transit, to take place between a blade of the lower rotor and a valley of the upper one; see successively each of Figs. 6 to 10.

From the foregoing consideration of Figs. 13 to 25 it is evident that the barrier formation takes place between a plurality of different pairs of rotor parts, during each transit of a blade through a valley, but only at a single location at any given instant. Consequently no wholly enclosed sealed space is at any time presented between the rotors, and there is no trapping of the fluid in a closed space of changing volume, whether decreasing or increasing. In association with this barrier formation at multiple positions centrally between the rotors, the adjacent fibrous mass is separated to the full extent adequate to maintain free running and avoid clogging.

Referring again to Figs. 13 to 25, it is pertinent to note, as to any given pair of opposed rotor parts coacting at a particular time as the barrier forming means, whether the barrier be at X, Y or Z, that the direction of travel of such barrier formation is toward the right or inlet side, continuing until the parts mutually retreat and provide an opening for fluid passage between them. And since such opening is toward the right, any thin tenuous layer of fibres in the clearance space between the parts is cleared back into the incoming fluid at the suction side of the pump.

As to certain pairs of coacting rotor elements, namely a blade tip of one and a valley ridge of the other, and also a blade shoulder 27 or 28 of one rotor and a blade shoulder 28 or 27 of the other, this fibre-mass separating action is typically one of shearing. I say "fibre mass" by way of contrast to individual suspended fibres which latter individually are not and cannot be severed, owing to the predetermined and controlled clearance as already described.

Further, by the expression "shearing action on the fibrous mass of the suspension" it is meant that such mass, as contrasted with individual fibres thereof, is positively divided by the shearing elements throughout their area of contact with the separated mass portions, and as further contrasted with an irregular tearing action. It will be understood, however, that since the elements in question do not make closed contact but have a deliberate clearance, the shearingly separated mass portions may be more or less tenuously connected at the clearance region by a layer of fibres, not greater in thickness than the clearance dimension. Any such layer however is non-cumulative and the individual fibres forming it are constantly subject to replacement by others in the course of the continued rotative movement of one or both of the coacting shearing elements. This shearing action is analogous to that which may be observed when a knife blade is passed through a wet stock mass for sampling and testing purposes, where the fibres tend to drape over the blade and to present a welt-like fold or lap along it. It is believed to be a similar fibre formation at and traveling with the blade tips at the clearance regions which herein materially contributes to the effective sealing action.

In this connection, the rapidity with which the blade tip thrusts into and lifts out of the valley, on entrance into and exit from it, is particularly to be noted. Referring to Figs. 13, 14 and 15, it will be seen that the effective descent of the blade, from a position outside the pitch circle, as in Fig. 13, to a relation of maximum approach to the valley wall, has been completed within the ten degree progression from Fig. 13 to Fig. 15. Conversely, see Figs. 23 to 25 as to the like rapid exit of the blade.

This feature is of special importance as contributing to a definite separation of the fibrous mass at the region mentioned, again noting particularly Figs. 13 to 15 and the action as between the tip of the blade 26 and the opposite valley ridge 32. Here the mass-separating interaction between said parts not only is a shearing but is so abrupt as to have the character of a guillotining shear, particularly efficient for definitely dividing a fibrous mass such as the suspension content here concerned.

At positions of a blade in a valley other than at a ridge of the latter the differential linear velocity of the opposed parts has a scuffing effect upon any fibrous matter between them. Further, the rearwardly increasing clearance at the blade tips, both with reference to an adjacent valley wall and to the casing wall during their travel along the latter, further contributes to preventing accumulation or matting of fibrous matter upon them or on the wall surfaces. It is further apparent that at the central region between the rotors, where the imaginary pitch circles are tangential, there is no rolling contact and no close opposition of circumferential surfaces, and hence no possibility for a fibrous mass to be so interposed between radially contiguous parts in the line between the rotor axes as to impose a toggle-like stress tending to spread apart or distort the rotors.

To this point the rotors have been described without reference to other than a uniform diameter for the several parts throughout the entire length of the respective rotors. Such uniform diametral or general cylindrical formation is found satisfactory in many instances, particularly where the fibrous percentage of the suspension to be pumped is relatively low or where for the most part the matter is liquid or substantially so.

In the embodiment as illustrated in Figs. 1 to 12 and 26 to 30, which is preferred for the higher consistencies of fibrous suspensions, the rotors have a double conical form, with the two cone portions base to base at midlength of the rotors. From the central transverse plane, where the rotors are thus of maximum diameter, the blades and the valleys respectively decline and rise progressively, oppositely as to the two cone portions, so as to approach and preferably merge into or substantially into coincidence with the pitch circles P at or adjacent the rotor ends and proximate to the casing end walls. It will be understood that the angular position and relation of the several blade and valley parts remains the same throughout the length of the rotors, except for certain additional formations near the rotor ends, to be referred to. In other words, the operational series of views Figs. 13 to 25 illustrates the interaction at any point along the rotors as well as at their central cross section; similarly, they represent any cross section along rotors of cylindrical form, such as those of the later figures, as well as the actual mid-length section of the double conical form of the invention.

Referring now to Figs. 4, 5, 5a, 11, 12 and particularly to the series of cross-sections Figs. 26 to 30, it will be noted that as the blade elements 26 decline in height or radial extent toward the opposite ends of the rotors they also become of less angular extent at the region of the pitch circle. This also is true as to the main, central or through portion of the valleys 30. Consequently at or near the rotor ends there is in the region of the pitch circles a greater distance between the positions of the successive seal-off lines or barriers formed by the blade and valley elements as previously described in connection with Figs. 13 to 25. Otherwise stated, a complete passage of a blade through a valley, which in Figs. 13 to 25 occupies 60° of rotor revolution, occurs in the course of a less angle of travel, at least as regards the central blade elements 26 and the center or main valleys 30. Desirably, therefore, a supplemental sealing action between the rotors is provided for near their respective ends.

Figure 27:
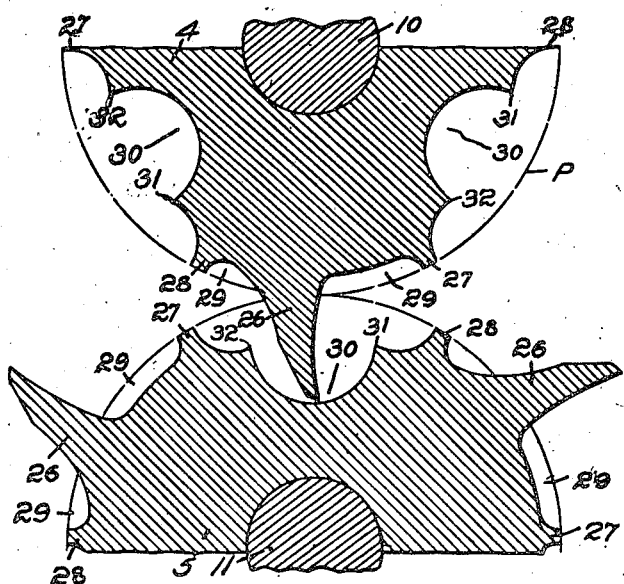

Fig. 26 is a central cross-section, similarly as in Fig. 3, but on a somewhat larger scale and is here included to facilitate comparison with the following views of the series. In Fig. 27 only the same parts appear as in Fig. 26, but it is readily seen that the central blade and valley members are of decrease radial dimension. This Fig. 27, taken approximately on the line 27—27 of Fig. 11, represents the condition to either side of the central cross-section at the corresponding distance axially. Figs. 28, 29 and 30, taken approximately on the correspondingly numbered section lines of Fig. 11, are successively nearer to the rotor ends, it being understood that an end view would show each rotor as an uninterrupted full circle, of the same diameter as the pitch circle, see Fig. 5a.

In Fig. 28 the first of the supplemental sealing elements appear, comprising the ribs or bosses 33, 34 at the leading and trailing side edges respectively of the valley 30. These may be regarded as developments of the valley ridges 31, 32 which in effect have been elevated to or just short of the pitch circle level. Between these bosses 33, 34 and the adjacent blade shoulder 28 or 27 as the case may be, the rotor remains relieved, thus in effect providing supplemental valleys or depressions 30a separated from the central main valley portion 30.

Continuing outward along the rotors, noting Fig. 29, it will be seen that the valley side bosses 33, 34 have increased in angular extent. At this location a further pair of auxiliary rib-like bosses or shoulders 35, 36 appear, respectively ahead of and behind the main blade members 26. These are of similar height as the blade shoulders 27, 28 and in effect divide the recessed areas 29, 29 at the opposite sides of the blades each into two separated grooves or longitudinal recess portions. These supplemental pairs of sealer elements 33, 34 associated with the valleys and 35, 36 adjacent the blades are further seen in Fig. 30, this being a section relatively close to the rotor ends, where the several parts are approaching coincidence with the line of the pitch circle. In this connection see particularly Figs. 5 and 5a.

An important advantage immediately resulting from a double conical construction of the rotors as here illustrated and described by way of example is the complete avoidance of packing of the fibrous matter at the ends of the rotors, between them and the casing end walls. This is evident from the fact that there are no end walls for any of the fluid driving and sealing elements of the rotors and no corresponding opposing of the casing end wall portions and hence no space at the rotor ends in which the fibrous matter could collect with objectionable results. In this connection see particularly Fig. 4, noting the approach to coincidence of the casing wall and the rotor parts adjacent the packing means represented by the longitudinal series of rectangular hatched elements, such coincidence being substantially at the line of the pitch circle as previously indicated.

A further important advantage resident in the double conical formation for the rotors is in connection with the action thereby had along the outer edges of the blades at the region where they enter and leave the surrounding outer wall portions of the casing, adjacent the inner ends of the intake and discharge ports 8 and 9, especially that at the inlet. Referring to Fig. 3, at the upper right portion, a blade 26 is seen in a position in which it has just crossed the inner edge 8a of the intake port. Bearing in mind the decreasing height of the blades in this double conical construction, it is evident that the longer radial portion of each blade, at midlength of the rotors, crosses this non-radial inlet port edge 8a ahead of the lower blade portions nearer the rotor ends, and that this action occurs progressively lengthwise the rotors, outwardly in opposite directions from their central sections. By reason of the previously described blade tip formation, and of the port edge formation 8a, the action between these parts is distinctly in the nature of a shearing of the fibrous mass of the fluid. Moreover, this shearing action, for the reasons stated, takes place progressively lengthwise of the rotors and hence is accomplished with less stress and under a decreased application of force at a given instant, the action being distributed over a longer time interval, as contrasted with the force required were the full length of the blade to impact the mass at the shear line simultaneously.

Thus, here still speaking more particularly of the double conical construction for the rotors, it is evident from the foregoing that as a tip of a blade of one rotor enters a valley of the other, as at a position substantially as in or just prior to that of Fig. 15, there is a distinct shearing action upon the fibrous mass. During subsequent travel of such blade tip through the valley, Figs. 16 through 23, the action on the fibrous material between these relatively moving parts is solely one of scuffing. This same type of action also takes place at the rotor blade tips as they follow around the inner surface of the double conical portion of the pump casing. Also, as each rotor blade leaves the inlet port or region 8 and approaches and enters said double conical casing portion in the vicinity of the port edge 8a, Fig. 3 upper right, the action on the fibrous mass is in the nature of shearing. Further, as between each of the coacting pairs of angular cut-off shoulders 27, 28 of the two rotors during their approach to relative positions of minimum clearance, as for example at X in Fig. 14 and Z in Fig. 24, there is a true shearing action by these like-moving parts upon the fibrous material adjacent them and in the inter-rotor spaces $v$, $v'$.

It has above been noted that in the double conical rotor construction the avoidance of space at the rotor ends in which fibrous matter could collect is of particular advantage. This is because fibre accumulations such as referred to, and which are here prevented, produce the tendency to plug and therefore increase the power consumption. The objectionable collections of compacted fibrous matter also cause undue wear on the pump casing at the rotor ends and accordingly make for increased maintenance costs. For these reasons a rotor construction of a tapering or double conical character such as here illustrated and described by way of example is generally preferable, particularly in the handling of the higher fibrous consistencies of the stock and in operating under high pressure.

For various installations, however, including those for operation at lower pressures or with the lower consistencies of fibrous stock, and in any case where power consumption or maintenance are not vital factors to be considered, a general cylindrical construction may be employed for the rotors, having reference to the surface generated by the tips of their blades, in other words, constructions in which the rotors are of uniform diameter or substantially so from end to end.

One such modified construction, of the cylindrical type, is illustrated in Figs. 31 to 34. Referring to said figures, similar reference numerals are used for parts corresponding to those of the previous figures, with the addition of zeros. It will be noted that Figs. 31, 32 and 33 are end elevations of portions of the two rotors 40, 50, at their central inter-axis region adjacent the common radius joining the two rotor centers. With the exception of the special end structure such as represented in enlarged detail in Fig. 34, a cross-section through the rotors at any point along their axes would show the same contour. In this connection it may also be noted that the central sectional views of the previous figures, such as Figs. 2, 3, 12, the entire series Figs. 13 to 25, also Fig. 26, may also be regarded as representative of a cylindrical type of construction as would result from maintaining the diameters for the respective parts uniform throughout the rotor lengths. Accordingly, as to the general manner of operation and coaction of the corresponding parts, the series of views Figs. 13 to 25 may be regarded as applicable also in connection with cylindrical rotor forms such as that of Figs. 31 to 34.

The relative position for the parts as in Fig. 31 is that with a blade 260 of the lower rotor 50 and the valley 300 of the rotor 40 in 30° left position. It thus corresponds to Fig. 13, except that in the latter a blade of the upper rotor and a valley of the lower one is represented. The valley elements 300 are of generally similar conformation as in the previous views, including the leading and trailing ridges or raised portions 310, 320. The vane or blade element indicated as a whole by the numeral 250 includes the main or blade member proper 260 having an angular tip or leading edge portion 260a, recedent outer end portion 260b and a substantially radial thrust flank of slightly concave contour as at 260c. The blade element 250 further comprises the leading and trailing angular cut-off shoulders 270 and 280.

Hence as explained in connection with the preceding views, there is a single but shifting barrier formation or line of cut-off successively between a pair of shoulders 270, 280, as at X in Fig. 31, then between the tip of a blade 260 and a valley ridge 320, as at Y in Fig. 32, and continuously between such blade tip and the opposite valley wall as the blade traverses the latter to the corresponding valley ridge 310, and thereafter between another pair of cut-off shoulders 280, 270, similarly as at Z, Figs. 24, 25. The action of the parts with reference to the fibrous mass likewise is similar to that as already described, including a shearing action as between the coacting shoulder pairs, also where a blade tip has maximum approach to a valley ridge, together with a scuffing action as a rotor blade travels through a valley. Where the blade tips successively leave the inlet port and approach and enter the cylindrical enclosing part of the pump casing, a shearing action also is had, in this instance simultaneously along the full length of the blade. If desired this latter action may be effected progessively in the direction lengthwise the rotors by presenting the blades and the inner edge of the port in non-parallel or lengthwise inclined angular relation to each other, as by providing the blades with a slight spiral or longitudinal inclination, as for example about 10° which construction may be assumed in connection with the rotors of Figs. 31 to 34.

With the cylindrical type of construction as in Figs. 31 to 34 there is opportunity for accumulation of fibrous matter at the rotor ends and this is somewhat increased by any spiralling of the blades, by reason of the then tendency of the matter to work toward that end of the rotor casing adjacent the rearmost part of the blade. These disadvantages, which are less important when operating under relatively low pressures or with fibrous suspensions at relatively low consistencies, may in large measure be counteracted by means provided for that purpose at the rotor ends.

Accordingly in the embodiments as illustrated by way of example in Figs. 31 to 36, each main blade member 260 is formed at its opposite ends with a rib or boss 60 having a rearwardly bevelled outer end face 60a, that is, facing the reader in Figs. 31 to 33. This boss follows the contour of the radial thrust face 260c. The inclined or bevel formation is seen on a larger scale in Fig. 34, a section lengthwise through a blade and through the adjacent casing wall 2, as for example on the line 34—34 of Fig. 33. Rearwardly of the boss 60 the blade end wall is relieved, as at 60b, Fig. 34. Thus as a blade travels along in close proximity to the inner surface 2X of the casing end wall, a scuffing action is there produced on the fibrous matter, while at the same time excessive leakage or slip at this region is prevented, the space between the blade and the casing wall being filled with the fibrous matter. A predetermined clearance such as previously referred to is provided between the highest or outer part of the bevelled boss 60.

A similar bevelled boss formation also desirably is provided angularly across the end of the blade element 250 as a whole, between its angular cut-off shoulders 270, 280, concentric with the pitch circle, with clearance provisions as previously described. It will be understood that the higher portion of this boss 61 is that nearest the pitch circle, the end face of the boss inclining inwardly, that is, away from the viewer in Figs. 31 to 33. A similar bevelled boss formation also desirably is provided adjacent trailing portions of the valleys 300, as at 62. These end bosses may be integrally or otherwise formed, as by welding on material, the bosses 60 at the ends of the blades proper 260 preferably being machined.

With a construction such as illustrated and described by way of example, pumps of this cylindrical type embodying my invention have been successfully operated to pump fibrous stock in a pulp mill, at a fibrous consistence in excess of 12% and against heads up to about 140 ft. It will be understood that these figures are given as illustrations and not as denoting limits of capacity.

In the constructions shown by way of example in Figs. 35, 36 and 36A, I have illustrated control formations for the valleys 300 of the rotors whereby a scuffing and distributing action upon the fibrous matter is had attendant on entrance of a blade into a valley, as contrasted with the shearing action obtained under the relatively peaked or crested formation for the valley ridges 32 or 320 of the preceding figures. In each of these figures the angular cut-off shoulders 270 of the blades are as before.

Fig. 35 represents one type of control variation, in which the valley side wall portion between such shoulder 270 and the point substantially corresponding to that of the ridge 320 of the preceding figures is extended out substantially along the line of the main wall of the valley 300 and thence angularly to join the shoulder near the mouth of the valley. Such formation, under which the extension of the valley side wall may follow various different contours or levels intermediate that of Fig. 35 and that of Figs. 31 to 33 or the preceding figures, is appropriate for high-pressure installations and instances where the described shearing action is less desirable.

Figs. 36 and 36A represent another type of adjustment under which the valley ridges such as 320 of Figs. 31 to 33 or 32 of the earlier figures are in effect lowered or rounded and flattened, as between positions as indicated at 320x in Fig. 36A and at 320x' in Fig. 36. Such conformation, similarly as in Fig. 35, is appropriate for conditions under which a shearing action at this location is not desired, and for operation under lower pressures, proportionately as the valley wall formation approaches the non-ribbed formation as at 320x'.

In the actual operations as shortly above referred to, and merely by way of specific example of suitable size of pump installation in such instances, the following dimensions and characteristics of a typical pump as there employed are noted: rotor diameter, approximately 12 in.; rotor length, also approximately 12 in.; theoretical displacement per revolution, 0.7 cu. ft.; displacement of pump at 75 R. P. M., 52.5 cu. ft.; actual power required at 75 R. P. M. pumping 12% stock at 200 tons per day against a 20-foot static head, 7 H. P.

From the foregoing description taken in connection with the drawings, it will be understood that my invention provides for pumping fibrous stock, pulp and like cellulosic fibrous suspensions of relatively high fibrous percentage or consistency and without materially or objectionably modifying the characteristics and properties of the suspension matter, as to consistency, freeness, degree of hydrating, etc. By thus making it possible to treat fibrous stock at a higher consistency, the use of steam and chemicals may be reduced and the quality of the pulp improved. Considerable auxiliary equipment as generally employed in the pulp and paper industries may be dispensed with, including thickeners and other preliminary or intermediate apparatus, with corresponding power saving. The pump of the present invention, by reason of its capacity to force and discharge pulp against pressures above atmospheric may be adapted to use in continuous pulp treating systems involving high temperature and high pressure conditions and is equally adapted for metering out fibrous stock at atmospheric or other pressure.

With reference particularly to the double conical form of the rotors and the attendant advantages, including the absence of end walls at which wear, clogging or excessive slip tendencies could develop, and the longitudinally progressive shearant action at the inner terminal of the intake port, it is further noted that in this instance complete balance is had for the rotors, in the direction axially thereof, any axial thrust being equalized in the opposite directions by reason of the center-to-end taper of the rotor blades and the corresponding end-to-center depth increase at the rotor valleys. Also any eventual wear between the rotors and the casing, if any, must be at the circumferential part of the casing, where maintenance attention readily can be given.

In each of the illustrated embodiments it is again emphasized that there is no circumferential surface engagement or direct radial opposition at the region of the line of centers, as to any rotor parts which are equi-distant from the rotor centers and hence traveling at the same angular velocity. Thus at the region mentioned there is a differential motion between all radially proximate parts. Consequently any fibrous substance seeking passage between such parts is subject to a scuffing and distributive action, tending to clear the interspace, as contrasted with a compressive action between non-relatively moving surfaces such as would there cause clogging compaction of the suspension substance.

Among the difficulties experienced in attempted uses of centrifugal pumps for fluid fibrous suspensions at consistencies such as here concerned has been the tendency of such pumps to become airbound, under which condition an accumulation of air at the eye of the pump blocks entry of the stock. Efforts have been made to overcome this, with indifferent results, as by associating a screw propeller or impeller with the intake side of the pump to assist flow of thick stock into the casing. Any such difficulty is avoided in accordance with my invention, the action of the pump being of a positive character, the stock mass being positively discharged, in a manner tending to create a vacuum in the space previously occupied by it. Such partial vacuum or suction force is more than adequate to induce and maintain a stock flow into the pump.

In connection with the oppositely tapered structure for the rotors, as best seen for example in Figs. 4, 5, 5a and 11, I have herein for convenience referred to the same as "double conical," mainly by way of differentiating such type of formation from those in which the rotors have a general overall cylindrical form, of uniform diameter at the various corresponding points along the rotor axes. Obviously, by reference to the drawings, the tapered or inclined rotor portions referred to are conical in the sense of being frusta, oppositely disposed, with their wider or base portions joined. If desired, this conical or non-cylindrical embodiment of the rotors may comprise additional sets of tapering portions lengthwise the rotors of more or less than one-half the total rotor length, the plurality of co-acting rotors being similarly formed in this respect, as also the surrounding circumferential portion of the pump casing.

Heretofore solids in liquid suspension have generally been pumped, if at all, by high-speed centrifugal devices or have been advanced by screw-propellers and other conveyors. However, I am aware that it has been proposed to construct rotary pumps of a positive displacement type for handling certain solids in suspension, including on the one hand relatively hard granular particles as found in fluids containing dirt, sand, gravel, carbonaceous matter and the like abrasive materials, and on the other hand substances such as sludge, slime and other suspensions of minute finely-packing matter; also for certain viscous liquids or semi-liquids. Such proposals have usually followed the belief that tight-running rotor and casing relations are essential, presumably because of the abrasive or dense compactive natures of the solid content. Accordingly they resorted to surface-scraping provisions, flexible sealing or packing means at rotor peripheries, and, for the sludge-type suspensions and viscous liquids, pressure-relieving by-pass ducts and such associated with the rotors and casings.

But in seeking to adapt a positive displacement type of pumping to use with cellulosic fibrous fluids at the various consistencies as to fibre percentage up to and especially including those in the range of 7-8% to 14-15% and higher, I have deliberately turned away from the general prior practice based on the belief mentioned, and the resulting pump of the invention is characterized by the avoidance of means such as just above referred to. However, while primarily concerned with the pumping of fibrous suspensions and being distinctive in the respects noted, the principles and means of the invention as herein disclosed, including the associated features of predetermined substantial clearance, mass-separation by shearing and by scuffing, and avoidance of trapping, are also applicable to pumping other suspensions and fluids such as above mentioned, particularly in view of the relatively low peripheral speed at which the rotors of my pump are operable as compared with rotor speeds of centrifugal and velocity pumps, whereby abrasion, cavitation and eroding effects are accordingly reduced.

My present invention, either as to means or method, is not limited to the particular embodiments as illustrated or described nor to the specific steps disclosed, its scope being pointed out in the appended claims.

I claim:

1. In a rotary-piston pump, a plurality of co-active rotors with parallel axes and having alternating vanes and valleys, and associated means particularly adapting said rotors for pumping fibrous pulp suspensions, said means comprising for each vane a blade-like conformation supported rearwardly and inwardly and presenting a central substantially radial thrust flank, an angular tip, and an angular shoulder at each side of the thrust flank and defining the edges of the adjacent valleys at a radial extent not exceeding one-half the distance between the rotor axes, and said means further comprising for each valley a curved bottom wall and side walls divergent into juncture with said angular shoulders, said vanes and valleys being of substantially equal circumferential extent and so proportioned and related that in each passage of a vane through a valley a substantialy linear sealing effect is had in continuous non-lapping succession between a pair of vane shoulders, a vane tip and a valley wall, and a following shoulder pair in said order and whereby the fibrous mass at the region between the rotor axes receives plural non-compactive separation.

2. A rotary-piston pump characterized by a controlled displacement, comprising, in combination: a casing defining a rotor chamber; a plurality of interacting rotors therein on parallel axes transverse to the path of flow; each rotor having a circumferential series of alternated projective elements and valley elements; each projective element having a central radial thrust flank, an angular rearwardly relieved tip, and each valley element including rounded bottom and flaring side walls; said projective elements adapted for rotative passage through the valley elements with the projective tips in a clearant relation and angular presentation to the valley walls selected to afford during each such passage an initial shearing and subsequent scuffing separant action upon any adjacent fibrous mass of a fibre suspension to be pumped and simultaneously throughout said actions to effect a single lineal seal at the tip advancing through a valley.

3. A rotary-piston pump for displacement-flowing cellulosic fibre suspensions, comprising, in combination: a casing defining a rotor chamber; a plurality of interactive rotors therein on parallel axes transverse to the path of flow; each rotor having a circumferential series of alternated projective thrust elements and valley elements; each projective element including a central blade having a radial thrust flank, a narrowing blade-like outer portion, an inwardly widening base and angular cut-off shoulders respectively ahead of and behind the thrust flank and of a radial extent not exceeding one-half the distance between the rotor axes the projective elements and the valley elements of the respective rotors being of an angular extent and relation such that the cut-off shoulders are angularly offset in their positions of mutual maximum approach; the valley elements presenting for cooperation with the shoulders and the blade-like outer portions of the thrust elements means providing a single shifting seal-off line at the interaxial region and whereby a mass-separating scuffing action is had for the fibrous content of pulpous suspensions to be pumped at consistencies up to and exceeding 5-6%.

4. Rotary means for displacement-pumping fibre suspensions, comprising, in combination: a casing having inlet and outlet ports and defining a rotor chamber between them; a plurality of like rotors in said chamber on parallel axes transverse to the path of flow between ports; means for synchronously driving the rotors in opposite directions; each rotor having a circumferential series of thrust elements and valley elements alternately interposed; said thrust elements each comprising a blade having a thrust flank in the general plane of the mid radius of its thrust element and terminating outwardly in a narrowing angular tip; said valley elements each comprising a central trough having at least at its trailing side a ridge formation merging inwardly into the trough wall and outwardly into a following thrust element; said ridge formations constituting with the blade tips means for controlling back flow of fluid and coacting with said tips to afford a definite shearant action upon the surrounding fibrous mass, whereby the pump is adapted efficiently to flow fibrous suspensions at consistencies below and also substantially in excess of 5-6%.

5. A rotary pump having rotors with interacting vanes and valleys and axes transverse to the flow path, said pump adapted for pumping fluid fibrous suspensions at consistencies up to and above 5-6%, the vanes and valleys being shaped and relatively proportioned to present in barrier-forming relation a plurality of pairs of coacting parts thereof at different angular locations along them but at a single such location at any given time, whereby continuously to provide escape for the fibrous mass in any space of varying volume at the region of the barrier, and maximal approaching vane and valley parts being formed to effect clearant separation of the fibrous mass as between opposite sides of the barrier.

6. A rotary pump in accordance with claim 5, wherein maximal approaching vane and valley parts are formed to afford fibrous mass separation characterized by a fibre-distributive scuffing action.

7. A rotary pump in accordance with claim 5, wherein maximal approaching vane and valley parts are formed to afford fibrous mass separation at certain barrier-forming relations of the parts characterized by a shearing action on the fibre mass.

8. A rotary pump having parallel-axis rotors with alternated coactive vanes and valleys, said pump adapted for controlled-displacement flowing of fibrous suspensions at consistencies up to and substantially in excess of 5–6%, the rotor vanes and valleys being formed to eliminate direct radial opposition between circumferential rotor areas in the region of the line of centers, each vane having a thrust flank along a generally radial plane midway between adjacent valleys, the vanes at their outer portions being reduced to blade-like form presenting outer edge faces meeting the thrust flanks at an acute angle to define leading tip portions, and said edge faces of the tip portions inclining inwardly away from the thrust flanks.

9. A rotary pump having parallel-axis rotors with alternated coactive vanes and valleys, said pump adapted for controlled-displacement flowing of fibrous-suspension fluids at consistencies up to and substantially in excess of 5–6%, the vanes being formed with thrust flanks along central generally radial planes, and the vanes and valleys being of substantially equal angular extent and being relatively shaped and proportioned to effect a plural differential separating action upon fibre masses at the region of maximum vane and valley approach.

10. A rotary pump having parallel-axis rotors with alternated coactive vanes and valleys, said pump adapted for controlled-displacement flowing of fibrous suspensions at consistencies up to and substantially in excess of 5–6%, the vanes provided with thrust flanks along generally radial planes midway between adjacent valleys, said vanes having narrowing outer portions terminating in tips having angular and rearwardly relieved leading corner portions, and an area of each valley being elevated for coaction with the tip of each entering vane for fibrous mass separating purposes.

11. A rotary pump having parallel-axis rotors with alternated coactive vanes and valleys, said pump adapted for controlled-displacement flowing of fibrous suspensions at consistencies up to and substantially in excess of 5–6%, the vanes provided with thrust flanks along central generally radial planes and with narrowing outer portions terminating in tips having angular leading corner portions, each vane formed with angular shoulders spaced respectively in advance of and rearwardly of the thrust flank and terminating radially adjacent a circle described by a radius of one-half the distance between the rotor axes, such shoulders located at the lateral termini of the respective adjoining valleys, the valleys being of substantially equal angular extent as the vanes and having elevated longitudinal zones along the opposite side walls for coaction with the vane tips respectively during entrance and withdrawal thereof relative to a valley, for clearance controlling, single seal forming and fibre-mass separating purposes.

12. A pump of the positive displacement type having rotors with interacting vanes and valleys and axes transverse to the flow path, said pump adapted to use with cellulosic fibrous suspensions at consistencies up to and substantially above 5–6%, the rotor vanes and valleys being angularly co-extensive with each other and presenting means maintaining at the inter-axial rotor region a continuously angularly shifting barrier while at all times providing a fluid passage at least to one side of such barrier for escape of fluid in one or the other direction relative to the barrier movement, and said means including formations subjecting the adjacent fibrous mass to a differential movement of barrier-forming parts thereby to effect clearant separation of such mass as between opposite sides of the barrier.

13. A pump for use in flowing cellulose fibre suspensions, up to and particularly including those at consistencies substantially in excess of 5–6%, said pump comprising, in combination, a case having spaced inlet and outlet ports, a plurality of rotary pistons on axes transverse to the flow path between the ports, each piston formed with a like plurality of blades and intervening valleys angularly coextensive with each other, means for synchronously driving the pistons for mutual and alternate traversing of a valley of one by a blade of the other, and coactive formations on the piston blades and at the piston valleys adapted for clearant separation of the fibrous mass at a plurality of angularly spaced positions successively during each transit of a blade through a valley and mutually to form at said positions, but solely at one of them at any given time, a moving barrier against reverse flow.

14. A controlled displacement rotary pump for fibrous suspensions, said pump comprising a plurality of similar piston elements rotatable on parallel axes transverse to the flow path, each such rotatable element including a plurality of angularly spaced thrust members projecting substantially beyond a circle described by a radius equal to one-half the inter-axis distance and having a radial leading face and an outer edge portion at an angle thereto of not more than 90°, said rotatable elements each further including a like plurality of intervening curved-wall valleys individually coextensive with the thrust members along the circumference of said circle and of a maximum depth radially inward of the described circle substantially equal to the projective extent of the thrust members, and coactive means on the thrust members adjacent said circles and upon the valley walls within said circles for separating fibrous masses and for effecting with the thrust members a fluid seal at angularly spaced positions successively.

15. A rotary pump for high-consistency and other fibrous-suspension fluids, comprising, in combination, a casing having spaced inlet and outlet ports, a plurality of like-formed rotors cooperatively disposed in the casing, each rotor having a series of angularly spaced alternated vane and valley formations, synchronizing drive means for the rotors to effect mutual and alternate coactive passage of a vane of one through a valley of another progressively to provide a substantially continuous cut-off as between the suction and the pressure sides of the pump at the zone between the rotor axes, said formations being of substantially equal angular extent and being relatively shaped, proportioned and arranged to afford adequate separating action upon fibrous matter at their positions of maximum mutual approach, and also to maintain for any interspace of changing volume continuous open communication at least to one side of said inter-axial zone.

16. A pump for cellulose fibre suspensions up to and including particularly those substantially above 5-6% consistency, comprising, in combination, a case defining a chamber having spaced inlet and outlet ports, a pair of rotors in said chamber on parallel axes transverse to the flow path between the ports, the rotors being formed with alternated valleys and projections, means synchronously driving the rotors for passage of a projection of one through a valley of the other mutually and alternately, the valleys and projections shaped and proportioned to present a minimum of circumferential surface at the pitch circles of the rotors and such circumferential surface of one rotor being angularly offset relative to that of the other rotor when at the region of the line of centers between rotors, and coacting means on the rotor valleys and projections affording a controlled clearance between them attendant on entrance of a projection into a valley and effectively barring back-flow while clearantly separating the surrounding fibre mass.

17. In a rotary piston pump, a rotor having a plurality of radial vanes and a valley between adjacent vanes, said vanes having relatively wide basal sections the opposite sides of which constitute the side walls of the valleys and the circumferential portions of which define a pitch circle for the rotor, the valleys and the vanes being of substantially equal angular extent at the pitch circle and there meeting to form intermediary shoulders, the basal section of each vane having a central blade projecting radially beyond the pitch circle and determining the major radius of the rotor, the valleys each being symmetrical with reference to a radius central thereof and being of maximum depth centrally, said maximum valley depth inwardly from the pitch circle substantially equalling the radial extent of blade projection beyond the pitch circle, the blades of the vanes each presenting at the leading side thereof a substantially radial thrust flank at the central radial plane of the vane and terminating outwardly in an angular tip, and the valleys each having therein upon the opposite side walls adjacent said shoulders symmetrical longitudinal valley-narrowing control formations of a cross-sectional contour and lateral extent calculated with reference to the character of the fibrous mass of suspensions thereof to be pumped and the maximum operating pressure for the pump.

18. In a rotary piston pump according to claim 17, the construction wherein said control formations comprise mass-shearing ridges.

19. A rotary piston pump particularly for fibrous suspensions, comprising coacting rotors on parallel axes and having like numbers of vanes and intervening valleys of mutually substantially equal angular extent, a casing surrounding the rotors and providing intake and output ports leading to and from the rotors, means for synchronously driving the rotors in opposite directions for mutual and alternate passage of a vane of one through a valley of the other at their inter-axis region, each vane having a central blade projecting radially beyond the axis-centered circle described on a radius of one-half the inter-axis distance and presenting a radial thrust flank terminating in an angular tip, and longitudinally extensive projectant means in the valleys for controlling the clearance between them and the blade tips during entrance and departure of the blades.

20. A rotary piston pump particularly for fibrous suspensions, comprising coacting rotors on parallel axes and having like numbers of vanes and intervening valleys, a rotor casing having intake and output ports, and synchronous drive means for the rotors, each vane having a main blade projecting radially beyond the axis-centered circle described on a radius of one-half the inter-axis distance and presenting a radial thrust flank terminating in a tip substantially central of the vane, and each vane also having a pair of angular cut-off shoulders respectively in front of and behind its blade and of a radial extent not beyond said circle, said shoulders also defining the respective side edges for the valleys, and being mutually offset angularly on the respective rotors when in the region of tangency of said circles thereof.

21. A rotary piston pump particularly for fibrous suspensions, comprising coacting rotors on parallel axes and having like numbers of vanes and intervening valleys, a casing surrounding the rotors and providing intake and output ports leading to and from the rotors, means for synchronously driving the rotors in opposite directions for mutual and alternate passage of a vane of one rotor through a valley of the other rotor at their inter-axis region, each vane having a central blade projecting radially beyond the axis-centered circle described on a radius of one-half the inter-axis distance and presenting a radial thrust flank and a tip portion, the vane blades and the valleys being angularly coextensive with each other and relatively proportioned for reception of the blades in and rotative passage through the valleys under a minimum predetermined clearance between the parts in all positions, and longitudinal formations in the valleys for controlling the clearance between them and the blade tip portions during entrance and departure of the blades.

22. A rotary piston pump particularly for fibrous suspensions, comprising a casing with intake and outlet ports, coacting rotors therein on parallel axes and having like numbers of vanes and intervening valleys, means for synchronously driving the rotors for mutual and alternate passage of a vane of one through a valley of the other at their inter-axis region, each vane having a central blade projecting radially beyond the axis-centered circle described on a radius of one-half the inter-axis distance and presenting a radial thrust flank and angular tip, each vane also having a pair of angular cut-off shoulders respectively in front of and behind its blade, of a radial extent not beyond said circle and disposed within an arc thereon approximating the width of a valley at said circle, the vane blades and the valleys being relatively proportioned for reception of the blades in and rotative passage through the valleys under a minimum predetermined clearance between the parts in all positions, and means at the sides of the valleys for controlling the clearance between them and the blade tips during entrance and departure of the blades.

23. A rotary pump according to claim 15 wherein the fibre-mass separating action includes that of shearing.

24. A rotary pump according to claim 15 wherein the fibre-mass separating action includes that of scuffing.

25. A rotary pump according to claim 15 where-

26. A rotary piston pump according to claim 20 wherein the rotors individually are of substantially uniform diameter throughout their longitudinal extents, as to corresponding parts.

27. A rotary piston pump according to claim 20 wherein the rotors individually are formed with different diameters at different longitudinal portions thereof, each similarly.

28. A rotary piston pump according to claim 20 wherein the respective rotors are of a double-conical conformation, with the conical portions base to base at substantially midlength of each rotor.

29. A rotary piston pump according to claim 20 wherein the respective rotors each have a generally conical portion at corresponding longitudinal locations.

30. A rotary piston pump according to claim 20 wherein the rotors are of a general cylindrical form and are provided at their end walls with longitudinally projecting bevelled rib-like formations for non-compactive sealing purposes.

31. A rotary piston pump according to claim 17 wherein the control formations in the valleys comprise peaked ridges.

32. A rotary piston pump according to claim 17 wherein the control formations in the valleys comprise raised rib-like projections lengthwise thereof.

33. A rotary piston pump according to claim 17 wherein the control formations in the valleys comprise longitudinal protuberances of curved sectional contour.

34. A rotary piston pump according to claim 17 wherein the control formations in the valleys comprise longitudinal curved-section rib-like formations of a height calculated with reference to maximum operating pressures.

35. In a rotary piston pump, a rotor having a plurality of radial vanes and a valley between adjacent vanes, said vanes and valleys of like angular extent, the vanes each comprising a central blade defining the major radius of the rotor and presenting a substantially radial thrust flank terminating in an angular tip, angular cut-off shoulders on the vanes respectively ahead of and behind the central blades and circumferentially staggered as between different rotors, for fibre-mass shearing, the valley elements having rounded bottom walls and side walls merging uninterruptedly into juncture with said cut-off shoulders.

36. In a rotary piston pump according to claim 35, the construction wherein the valley side walls have an outwardly continuous non-projectant contour fully to their juncture with the cut-off shoulders.

ERNEST P. COOK.

REFERENCES CITED

The following references are of record in the file of this patent:

UNITED STATES PATENTS

| Number | Name | Date |
|---|---|---|
| 106,165 | Hyndman | Aug. 9, 1870 |
| 515,212 | Green | Feb. 20, 1894 |
| 533,291 | Green | Jan. 29, 1895 |
| 533,292 | Green | Jan. 29, 1895 |
| 533,293 | Green | Jan. 29, 1895 |
| 678,480 | Green | July 16, 1901 |
| 688,616 | Ferguson | Dec. 10, 1901 |
| 2,022,610 | Wendell | Nov. 26, 1935 |